April 14, 1959   A. F. FAIRBANKS ET AL   2,882,416
INFRARED SCANNING SYSTEM
Filed Feb. 1, 1955   2 Sheets-Sheet 1

INVENTORS.
AVARD F. FAIRBANKS
THEODORE R. WHITNEY
BY
*William R. Lane*
ATTORNEY

*INVENTORS.*
AVARD F. FAIRBANKS
THEODORE R. WHITNEY

BY

*William R. Lane*

ATTORNEY

United States Patent Office 2,882,416
Patented Apr. 14, 1959

2,882,416

INFRARED SCANNING SYSTEM

Avard F. Fairbanks, South San Gabriel, and Theodore R. Whitney, Whittier, Calif., assignors to North American Aviation, Inc.

Application February 1, 1955, Serial No. 485,369

5 Claims. (Cl. 250—83.3)

This invention is an infrared scanning system and more particularly pertains to an infrared scanner which detects and provides electrical indications as to the position of infrared-radiating objects.

This invention is related to an application, Serial No. 485,301, filed by applicant on February 1, 1955, now abandoned, for an Infrared Landing System for Aircraft. The above identified application discloses a particular use of this scanner.

Radiations classed as thermal, or infrared, lie between the short-wave radio region and the visible region of the electromagnetic spectrum. A particular feature obtained by the use of infrared is the high angular resolution which it provides. That is, it provides, compared to radar, more accurate indications of bearings. Radar devices which provide angular resolution to the same accuracy are prohibitive in size, whereas practical devices utilizing infrared may be as small as two or three inches in diameter.

It is desirable in a scanning system that there be a minimum of vibration or unbalance as the scanner operates through a cycle. Inasmuch as particular portions of a scanner undergo motion, dynamic balancing is required and is generally achieved by symmetrical counterparts which likewise experience similar motion. Such counterweights and counterbalances add to the mass and cost of construction of the device. It is desirable therefore that a minimum of balancing mass be required and that symmetry about the axes of rotation be achieved. It is also desirable in a scanning system that an electrical output be obtained which indicates the position of the scanner in order that the signal of the infrared-sensitive element may be displayed.

This device is one of simplicity and with a minimum number of elements obtains a spiral scan. Dynamic balance is substantially achieved without the addition of counterbalances and counterweights.

It is therefore an object of this invention to provide an infrared scanner.

It is another object of this invention to provide a diminutive, balanced infrared scanner.

It is a further object of this invention to provide an infrared scanning system which provides electrical indications of the position of the scanner.

It is a further object of this invention to provide a scanning system for the detection and location of infrared-radiating sources.

It is a further object of this invention to provide a scanning system having a spiral scan.

Other objects of the invention will become apparent from the following description taken in connection with the accompanying drawings in which, Fig. 1 is a partial cross-section of a scanner;

Figure 1:
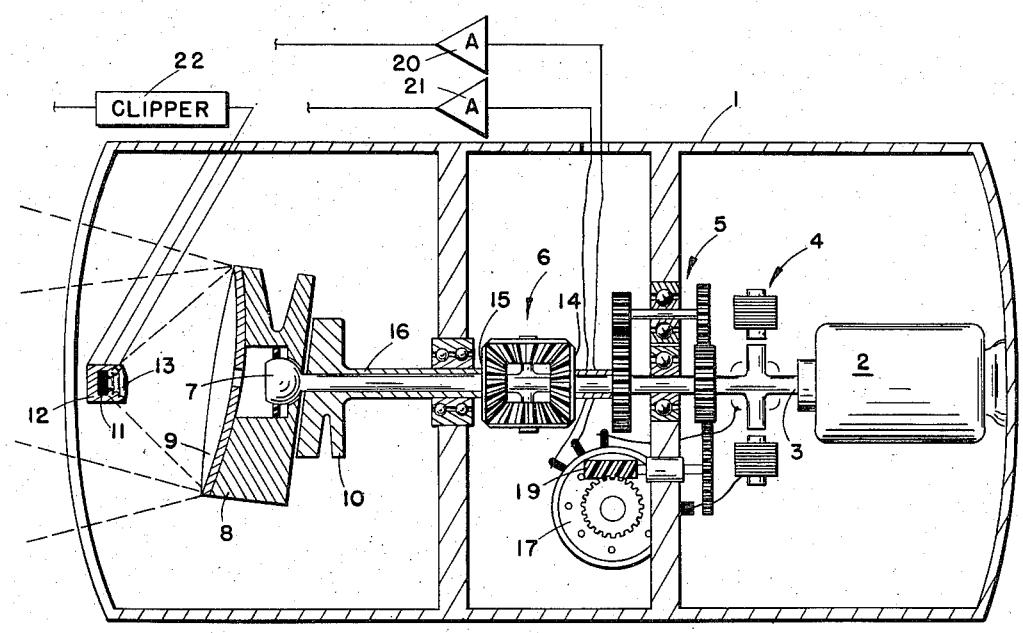

Referring now to Fig. 1, the scanning device is enclosed within a housing 1. A motor 2 drives shaft 3 upon which is located a two-phase generator 4, gear train 5, and differential 6. At the end of shaft 3 is a ball-joint 7, upon which is mounted a collector mirror 8. The front surface 9 of collector mirror 8 is spherically concave or paraboloidal in shape and faces in a direction to receive thermal or infrared radiation. The rearward portion of the collector mirror 8 is wedge-shaped and operates as a cam against the surface of cam 10. Infrared sensitive cell 11 is located at a given position in front of spherical mirror 9 and is enclosed within mounting structure 12, having an aperture 13 which is serrated to reduce reflections. Cells such as lead sulfide or lead telluride are available commercially to be used for the infrared sensitive device 11.

As motor 2 rotates shaft 3, and the spider of differential 6 and mirror 8, gears 5 are also rotated to cause the input gear 14 of differential 6 to rotate which causes output gear 15 of the differential 6 to rotate, rotating sleeve 16 and cam 10.

To obtain a spiral scan, mirror 8 is made to rotate by shaft 3 at 20 revolutions per second, for example, and cam 10 is made to rotate at 19 revolutions per second, slightly different from mirror 8 and in the same direction. How slight this difference is, depends on how fast the spiral sweep is desired to reach the center of the scanned area and out again. In order to obtain this, the spider of differential 6 is made to rotate at 20 revolutions per second by the rotation of shaft 3, and the input gear 14 is made to rotate at 1 revolution per second by the reduction of gears 5. This causes gear 15 to rotate at a speed of 19 revolutions per second.

As shaft 3 rotates, two-phase generator 4 provides two output voltages in quadrature with each other which are sent to potentiometers 17 and 18 (not shown) which are rotated by worm 19, also driven from gear train 5. The output of these potentiometers provides signals to amplifiers 20 and 21 to indicate electrically the scanning of mirror surface 9.

Figure 2:
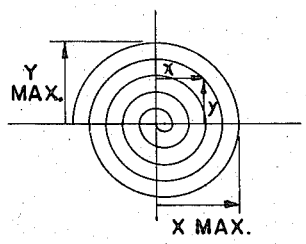
Fig. 2 is a spiral path scanned by the device of the invention.

Mirror 9 scans in a fashion shown in Fig. 2, which is a spiral. Two-phase generator 4 provides electrical sine wave signals in quadrature which have a maximum value of Y max. and X max., respectively. As the scanner proceeds into the spiral these signals must be diminished according to the number of times the scanner has rotated. Potentiometers 17 and 18 reduce the Y max. and X max. voltages to the actual values $x$ and $y$ as indicated in Fig. 2. The outputs of potentiometers 17 and 18 are connected to amplifiers 20 and 21.

Figure 3:
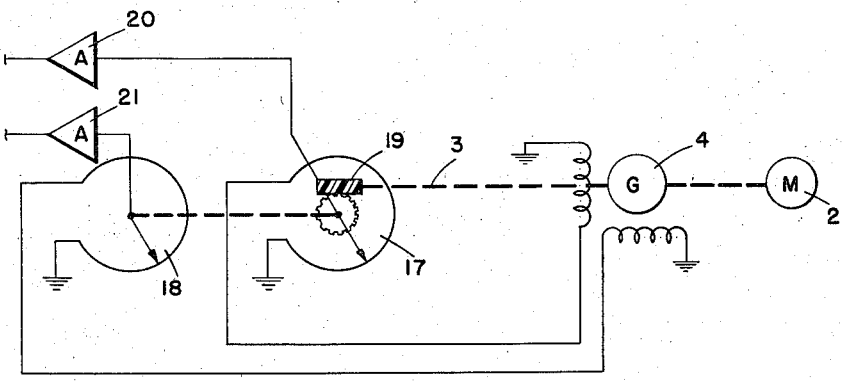
Fig. 3 is a schematic of the deflection circuit of the scanner.

Fig. 3 is a schematic indicating in more detail the relative connections of potentiometers 17 and 18 and generator 4. Each potentiometer receives a quadrature voltage from generator 4. The wiper of each potentiometer is driven by worm 19 to reduce the output voltage of generator 4 to instantaneous values of $x$ and $y$. The wipers of the potentiometers are connected to amplifiers 20 and 21.

Figure 4:
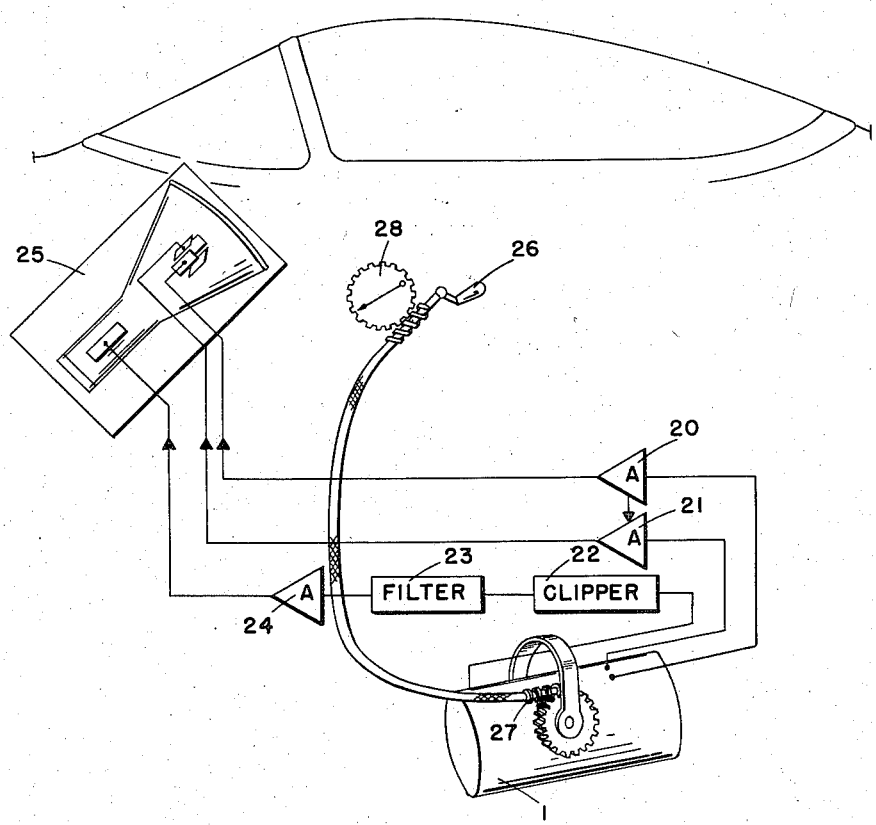
Fig. 4 is a block diagram of the infrared scanning system.

Fig. 4 illustrates presentation of the output of the receiver upon an oscilloscope. The signal received from the infrared sensitive element 11 is clipped by clipper 22 to remove all noise. It is then filtered by filter 23 and amplified by amplifier 24 which is connected to the intensity grid of oscilloscope 25. The outputs of potentiometers 17 and 18 are received in amplifiers 20 and 21 and sent to the vertical and horizontal deflection plates of oscilloscope 25. The aim of the infrared device is directed manually by control knob 26 which operates worm gear 27. A vertical indicator 28 indicates the vertical aim of the infrared device.

Although the invention has been described and illustrated in detail it is to be clearly understood that the same is by way of illustration and example only and is not to be taken by way of limitation, the spirit and scope of this invention being limited only by the terms of the appended claims.

We claim:

1. A scanner comprising a drive shaft, a collector mirror operated by said drive shaft, said mirror adapted to nutate with respect to said drive shaft, a differential, the spider of said differential connected to be driven by said shaft, the input gear of said differential connected to be driven by said shaft at a speed other than the speed of said spider, a cam connected to the output gear of said differential, said cam disposed to cause said mirror to nutate as it rotates.

2. A scanner comprising a drive shaft, a collector mirror connected to be spun by said shaft, said mirror adapted to nutate as it rotates, a differential, the spider of said differential driven by said shaft, the input gear of said differential connected to be driven by said shaft at a speed other than the speed of said spider, a cam connected to the output gear of said differential, said cam disposed to cause said mirror to nutate.

3. A scanner comprising a drive shaft, a collector mirror universally connected to the end of said shaft, a differential, the spider of said differential connected to be driven by said shaft, a gear train driven by said shaft, said gear train connected to drive the input gear of said differential at a speed slightly less than the speed of said spider, a wedge-shaped cam concentrically disposed on said shaft in abutting relationship with said mirror, a sleeve on said shaft connected to the output gear of said differential and said cam whereby said cam rotates at a speed which is the difference between the rotation of said shaft and the input gear of said differential.

4. A scanner comprising a drive shaft, a collector mirror connected to be spun by said drive shaft, said mirror adapted to nutate with respect to said drive shaft, a differential, the spider of said differential driven by said shaft, the input gear of said differential connected to be driven by said shaft at a speed other than the speed of said spider, a cam connected to the output gear of said differential, said cam disposed to cause said mirror to nutate as it rotates, a two-phase generator rotated by said shaft, two potentiometers whose wipers are positioned by said shaft, one of said potentiometers connected to receive one output phase of said generator and the other of said potentiometers connected to receive the other output phase of said generator, whereby the electrical output of said potentiometers represent the simultaneous horizontal and vertical aim of said collector mirror.

5. In an infrared scanning system a scanner comprising a drive shaft, a collector mirror connected to be spun by said drive shaft, said mirror adapted to nutate with respect to said drive shaft, a differential, the spider of said differential driven by said shaft, the input gear of said differential connected to be driven by said shaft at a speed other than the speed of said spider, a cam connected to the output gear of said differential, said cam disposed to cause said mirror to nutate as it rotates, a two-phase generator rotated by said shaft, two potentiometers whose wipers are positioned by said shaft, one of said potentiometers connected to receive one output phase of said generator and the other of said potentiometers connected to receive the other output phase of said generator, whereby the electrical output of said potentiometers represents electrically the aim of said scanner, and an infrared receiver having an infrared-sensitive element in spaced relationship with said scanner, said infrared-sensitive element located substantially at the local point of said collector mirror.

References Cited in the file of this patent

UNITED STATES PATENTS

| | | |
|---|---|---|
| 1,470,696 | Nicolson | Oct. 16, 1923 |
| 2,437,275 | Skene et al. | Mar. 9, 1948 |

OTHER REFERENCES

Submarine Signal Company, British Patent No. 406,903, March 8, 1934.

UNITED STATES PATENT OFFICE

CERTIFICATE OF CORRECTION

Patent No. 2,882,416                                                       April 14, 1959

Avard F. Fairbanks et al.

It is hereby certified that error appears in the printed specification of the above numbered patent requiring correction and that the said Letters Latent should read as corrected below.

Column 4, line 32, for "local" read — focal —.

Signed and sealed this 8th day of September 1959.

(SEAL)
Attest:
KARL H. AXLINE
Attesting Officer

ROBERT C. WATSO
Commissioner of Patent